(12) United States Patent
Hurst

(10) Patent No.: US 6,427,496 B1
(45) Date of Patent: Aug. 6, 2002

(54) FIFTH WHEEL LOCKING DEVICE

(76) Inventor: Harvey Hurst, Box 2895, Inuvik Northwest Territories (CA), X0E 0T0

( * ) Notice: Subject to any disclaimer, the term of this patent is extended or adjusted under 35 U.S.C. 154(b) by 0 days.

(21) Appl. No.: 09/760,573

(22) Filed: Jan. 16, 2001

(51) Int. Cl.[7] .............................................. E05B 73/00
(52) U.S. Cl. ........................................... 70/14; 70/232
(58) Field of Search ................................. 70/14, 18, 19, 70/229–232

(56) References Cited

U.S. PATENT DOCUMENTS

| 2,641,124 A | * | 6/1953 | Gallagher et al. ............ 70/232 |
|---|---|---|---|
| 2,883,850 A | * | 4/1959 | Falck .......................... 70/431 |
| 3,004,421 A | * | 10/1961 | Bowler ......................... 70/232 |
| 3,391,555 A | * | 7/1968 | Mamo .......................... 70/258 |
| 3,415,085 A | * | 12/1968 | Eble, Jr. ...................... 70/232 |
| 3,678,717 A | * | 7/1972 | Eaton ........................... 70/232 |
| 3,798,938 A | * | 3/1974 | McCullum ................ 70/232 X |
| 3,832,872 A | * | 9/1974 | Gerlach ........................ 70/232 |
| 3,982,413 A |   | 9/1976 | Stone et al. ................... 70/229 |
| 4,039,202 A |   | 8/1977 | Bamettler .................. 507/280 |
| 4,141,233 A |   | 2/1979 | Reyes .......................... 70/232 |
| 4,407,146 A | * | 10/1983 | Nielsen, Jr. ................... 70/232 |
| 4,419,872 A | * | 12/1983 | Plifka ............................ 70/18 |
| 4,423,610 A | * | 1/1984 | Hart et al. ................... 70/14 X |
| 4,459,832 A | * | 7/1984 | Avrea et al. .................... 70/14 |
| 4,502,306 A | * | 3/1985 | Scammacca ............. 70/232 X |
| 4,538,827 A | * | 9/1985 | Plifka ......................... 70/14 X |
| 4,620,718 A |   | 11/1986 | Mickleson .................. 280/507 |
| 4,693,096 A | * | 9/1987 | Mercer .......................... 70/14 |
| 4,823,568 A | * | 4/1989 | Rogers et al. ............. 70/14 X |
| 4,841,756 A | * | 6/1989 | Eaton .......................... 70/232 |
| 5,052,203 A | * | 10/1991 | Van Cuyk .................... 70/232 |
| 5,297,407 A | * | 3/1994 | Tarr ............................. 70/232 |
| 5,839,745 A |   | 11/1998 | Cattau et al. ............... 280/434 |
| 5,987,938 A | * | 11/1999 | Frei ............................. 70/14 |
| 6,161,402 A | * | 12/2000 | Moore .......................... 70/14 |

\* cited by examiner

Primary Examiner—Suzanne Dino Barrett
(74) Attorney, Agent, or Firm—Henderson & Sturm LLP

(57) ABSTRACT

A locking device (10) for the conventional hitch pin (100) on a trailer (200) wherein the device (10) includes a generally U-shaped rigid one piece collar member (20) having an enlarged opening (21) dimensioned to slidably receive the recessed neck portion (101) of the hitch pin (100). The legs (29) and (22) of the collar member (20) are provided with a pair of oppositely facing counterbores (24), (25) and a through bore (30) that are dimensioned to receive a tempered steel bar member (40) and a lock member (60) for captively engaging the bar member (40) across the enlarged opening (21) in the collar member (20).

16 Claims, 2 Drawing Sheets

FIFTH WHEEL LOCKING DEVICE

BACKGROUND OF THE INVENTION

1. Field of the Invention

The present invention relates to the field of kingpin locks in general, and in particular to a three piece locking arrangement for the kingpin or fifth wheel of a trailer or recreational vehicle.

2. Description of Related Art

As can be seen by reference to the following U.S. Pat. Nos. 3,982,413; 4,039,202; 4,141,233; 4,620,718; and 5,839,745, the prior art is replete with myriad and diverse kingpin locking arrangements that encircle the recessed portion of a conventional hitch pin.

While all of the aforementioned prior art constructions are more than adequate for the basic purpose and function for which they have been specifically designed, they are uniformly deficient with respect to their failure to provide a simple, efficient, and practical fifth wheel locking device which employs a collar and bar arrangement to surround the recessed portion of a trailer hitch pin. The clamp and bar arrangement are releasably engaged with one another via an offset lock mechanism.

As can be appreciated by reference to the above cited patents, a wide variety of kingpin locking devices have been developed to address the widespread threat of even very briefly unattended trailers being stolen both in broad daylight and even within view of a member of unsuspecting witnesses when the trailer is not provided with a fifth wheel locking device to prevent its unauthorized removal.

As a consequence of the foregoing situation, there has existed a longstanding need among trailer owners and tractor trailer operators for a new and improved fifth wheel locking device which is extremely simple to install and remove from a hitch pin, yet extremely difficult to remove by unauthorized individuals, and the provision of such a construction is a stated objective of the present invention.

BRIEF SUMMARY OF THE INVENTION

Briefly stated, the fifth wheel locking device that forms the basis of the present invention comprises in general, a collar unit, a bar unit, and a locking unit for releasably engaging the bar unit relative to the collar unit.

As will be explained in greater detail further on in the specification, the collar unit of the preferred embodiment includes a generally U-shaped rigid collar member having a pair of legs which define an enlarged opening dimensioned to receive the recessed neck portion of a conventional hitch pin. The collar member is provided with a through bore formed in one leg and a pair of oppositely facing and overlapping counter bores formed in the other leg.

In addition, the bar unit comprises an elongated tempered steel bar member having a straight intermediate portion and inboard end dimensioned to be received through the through bore and one of the counterbores. The locking unit includes a lock member which is secured in one of the counterbores and provided with a rotatable lock catch element which is adapted to extend into the other counterbore to engage a peripheral recess formed on the inboard end of the bar member. The outboard end of the bar member is angled to provide a hand grip element to facilitate the insertion and removal of the bar member relative to the collar member.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
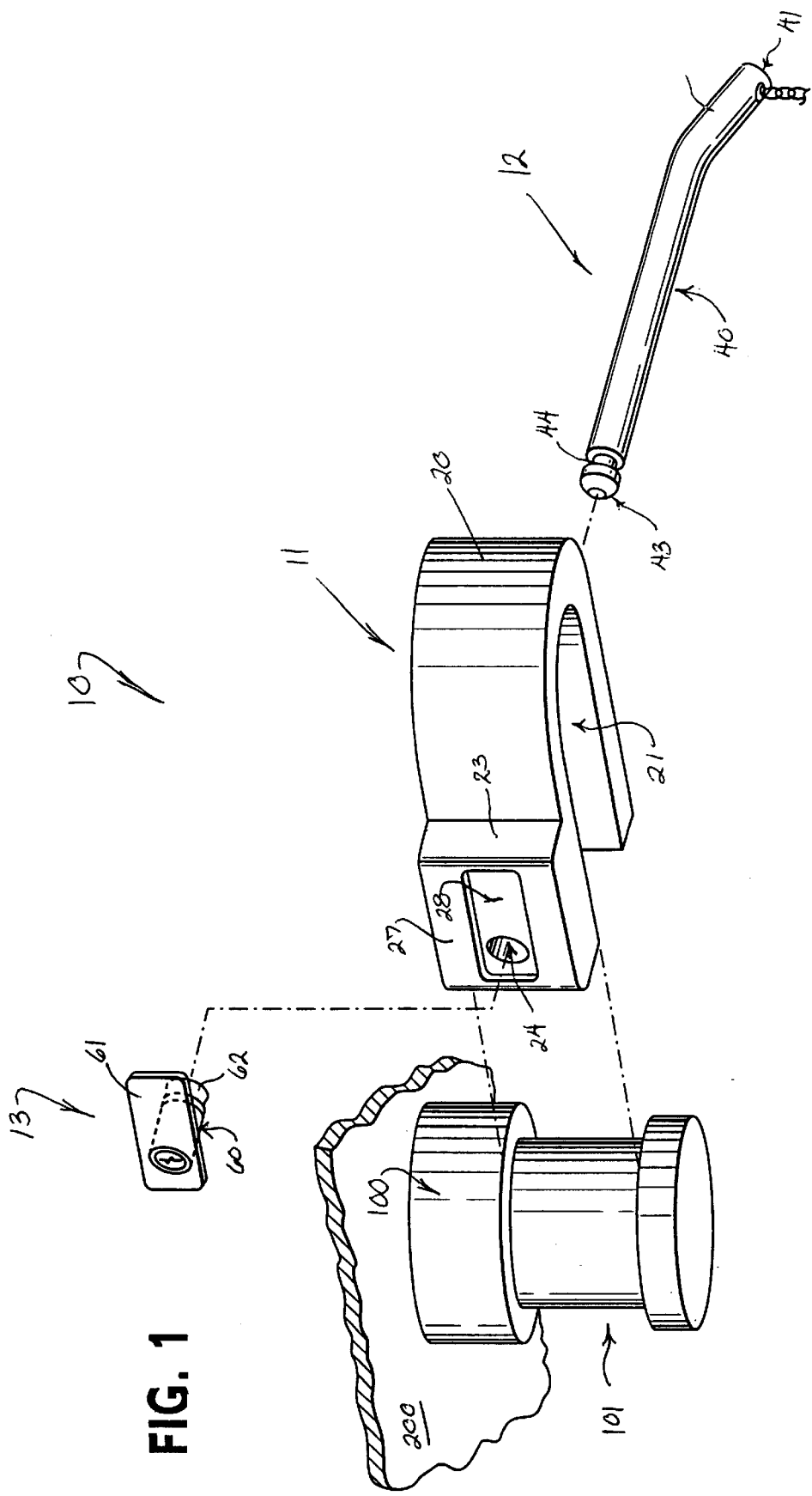
FIG. 1 is an exploded perspective view of the fifth wheel locking device that forms the basis of the present invention.

As can be seen by reference to the drawings, and in particular to FIG. 1, the fifth wheel locking device that forms the basis of the present invention is designated generally by the reference number 10. The device 14 comprises in general, a collar unit 11, a bar unit 12, and a locking unit 13. These units will now be described in seriatim fashion.

Figure 2:
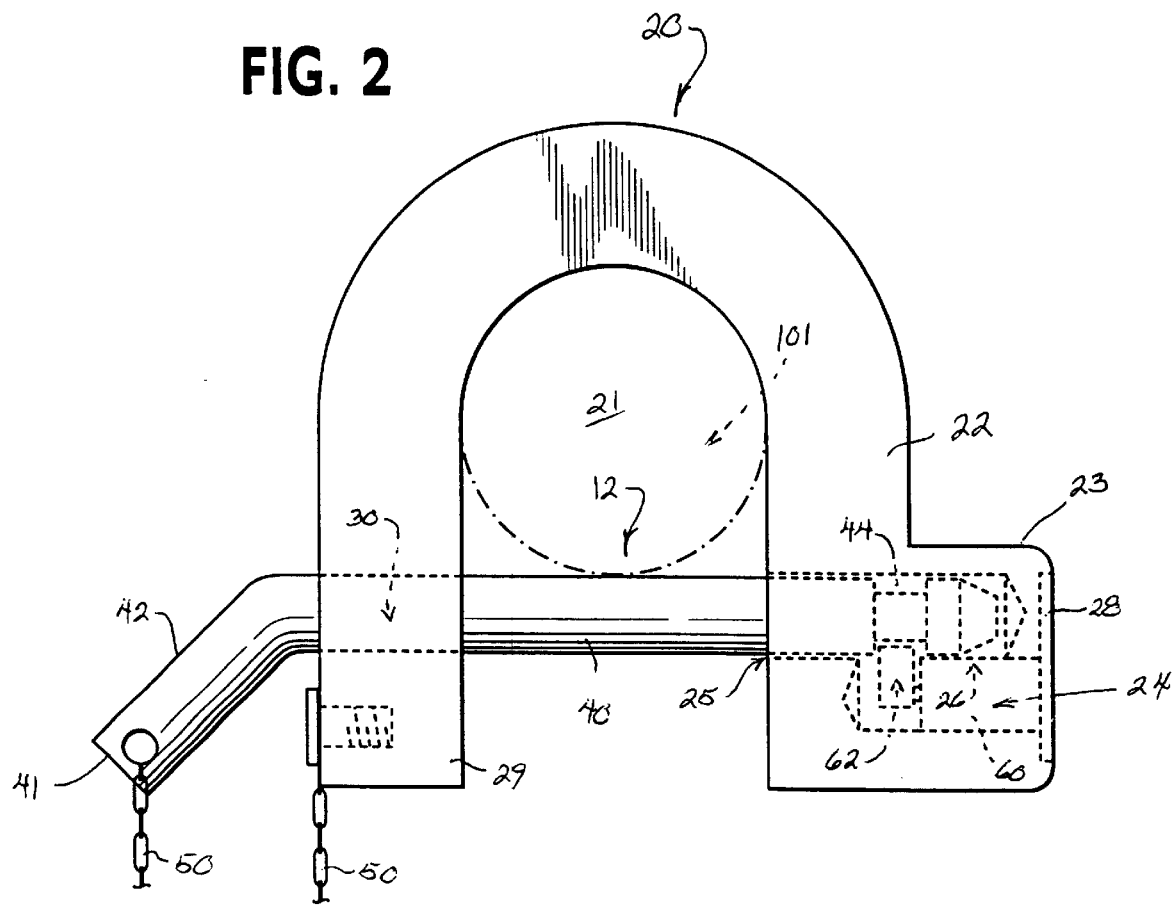
FIG. 2 is a top plan view of the fifth wheel locking device.

As shown in FIGS. 1 and 2, the collar unit 11 comprises a generally U-shaped collar member 20 preferably fabricated from stainless or tempered steel to resist efforts to cut through the collar member 20 with a hacksaw or the like.

In addition, the enlarged interior opening 21 in the U-shaped one piece collar member 20 has an interior diameter that is dimensioned to slidably receive the outside diameter of the recessed neck portion 101 of a hitch pin 100 which depends downwardly from the bottom of a conventional trailer or semi-trailer 200.

As can also be seen by reference to FIGS. 1 and 2, one of the legs 22 of the U-shaped collar member 20 is provided with an outwardly projecting increased thickness enlarged foot portion 23 whose purpose and function will be explained further on in the specification.

Figure 3:
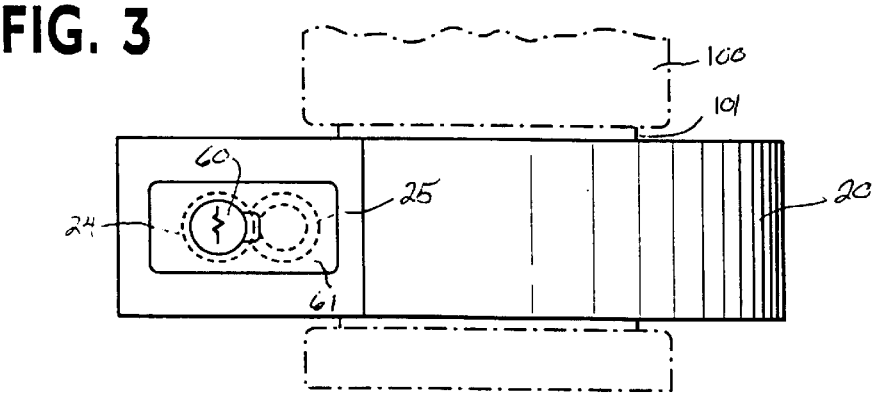
FIG. 3 is a side elevation view of the lock bearing side of the collar unit.

Turning now to FIGS. 1 through 3, it can be seen that the enlarged foot portion 23 of the collar member 20 is provided with a pair of oppositely directed counterbores 24 and 25 which overlap one another in a generally tangential fashion so that there is a lateral opening 26 formed by the overlapping counterbores 24, 25.

In addition, the counterbores 24 and 25 comprise an internal counterbore 25 which extends inwardly from the interior of the enlarged opening 21 in the roller member 20 and an external counterbore 24 which is formed on the exterior face 27 of the enlarged foot portion 23 of the collar member 20. The external counterbore 24 is disposed to one side of an enlarged shallow recess 28 that overlaps and extends beyond the location of the internal counterbore 25 for reasons that will be explained in greater detail further on in the specification.

As can best be seen by reference to FIG. 2, the generally uniform thickness leg 29 of the collar member 20 is provided with a through bore 30 which is axially aligned with the internal counterbore 25 in the enlarged foot member 23. Both the through bore 30 and the internal counterbore 25 are dimensioned to receive selected portions of the bar unit 12.

As shown in FIGS. 1 and 2, the bar unit 12 comprises an elongated contoured bar member 40 preferably fabricated from tempered steel or the like to resist cutting. The outboard end 41 of the bar member 40 has an angled relatively short handle section 42 to facilitate the grasping and manipulation of the bar member 40 and the long straight intermediate portion and inboard end 43 of the bar member 40 is dimensioned to be received in the through bore 30 and aligned internal counterbore 25 of the collar member 20 and further provided with a peripheral recess 44 proximate to, but spaced from, the terminus of the inboard end 43 of the bar member 40.

As can also be seen by reference to FIGS. 1 through 3, the locking unit 13 comprises a barrel lock member 60 whose outboard end is secured in a tempered steel plate 61 which is press fit and fixedly secured in the enlarged shallow recess 28 in the face of the enlarged foot portion 23 in one of the legs 22 of the collar member 20. The inboard end of the barrel lock member 60 is provided with a rotatable lock catch element 62 that is adapted to be received in the peripheral recess 44 in the bar member 40 for captively engaging the inboard end 43 of the bar member 40 within the internal counterbore 25 in the collar member 20 in a well recognized fashion.

Turning now to FIG. 2, it can be seen that this invention also contemplates the use of tethered connectors 50 to connect both the collar member 20 and the bar member 40 to the undercarriage of the trailer 200 so that they will always be available for use on the hitch pin 100; wherein, the tethered connectors 50 may optionally be provided with a warning tag now shown that will alert people that the locking device 10 is installed on the hitch pin 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A fifth wheel locking device for captively surrounding the recessed neck portion on a conventional trailer hitch pin wherein the device comprises:
   a collar unit including a generally U-shaped collar member having a pair of legs which define an enlarged collar opening which is dimensioned to slidably receive the recessed neck portion of the trailer hitch pin wherein one leg of the collar member is provided with a through bore and the other leg of the collar member is provided with an internal counterbore which extends inwardly from the enlarged opening in the collar member and which is alinged with said through bore; and, wherein the collar member is further provided with an external counterbore which overlaps said internal counterbore and forms a lateral opening between the internal counterbore and the external counterbore;
   a bar unit including an elongated bar member having selected portions that are dimensioned to be slidably received in said through bore and said internal counterbore; and
   means for captively engaging said bar member relative to the collar member such that a portion of the bar member extends at least a substantial distance into the enlarged opening in the collar member.

2. The device as in claim 1 wherein said bar member has an angled outboard end and a straight intermediate portion and inboard end.

3. The device as in claim 2 wherein the inboard end of the bar member is dimensioned to be slidably received in the through bore and internal counterbore in the collar member.

4. The device as in claim 1 wherein the collar unit comprises a one piece collar member.

5. The device as in claim 3 wherein the collar unit comprises a one piece collar member.

6. The device as in claim 1 wherein said means for captively engaging said bar member relative to the collar member comprises:
   a lock unit including a lock member dimensioned to be received in the external counterbore and having an inboard end provided with a rotatable lock catch element that is adapted to be received in said lateral opening.

7. The device as in claim 6 wherein the bar member has an inboard end dimensioned to be received in both the through bore and the internal counterbore.

8. The device as in claim 7 wherein the bar member is further provided with a peripheral recess that is disposed proximate to, but spaced from the inboard end of the bar member and wherein said peripheral recess is dimensioned to receive the rotatable lock catch element.

9. The device as in claim 8 wherein said lock member is surrounded by a hardened plate that extends beyond the internal counterbore.

10. A fifth wheel locking device for captively surrounding the recessed neck portion on a conventional trailer hitch pin wherein the device comprises:
    a bar unit including an elongated bar member having an outboard end and a straight intermediate portion and a straight inboard end wherein the intermediate portion and the inboard end are axially aligned with one another;
    a collar unit including a generally U-shaped collar member having a pair of legs which define an enlarged opening dimensioned to slidably receive the recessed neck portion of the hitch pin wherein one of said legs is provided with a through bore which is dimensioned to slidably receive the inboard end of the bar member; wherein the collar member is further provided with an internal counterbore formed in the other leg of the collar member and dimensioned to receive the inboard end of the bar member, and with an external counterbore which overlaps said internal counterbore and forms a lateral opening between the internal counterbore and the external counterbore; and
    means for captively engaging said bar member relative to the collar member such that the inboard end of the bar member extends a substantial distance across the enlarged opening in the collar member.

11. The device as in claim 10 wherein the collar member is a single piece.

12. The device as in claim 11 wherein the outboard end of the bar member is angled relative to the intermediate portion of the bar member.

13. The device as in claim 10 wherein said means for captively engaging said bar member relative to the collar member comprises:
    a lock unit including a lock member dimensioned to be received in the external counterbore and having an inboard end provided with a rotatable lock catch element that is adapted to be received in said lateral opening.

14. The device as in claim 13 wherein the bar member has an inboard end dimensioned to be received in both the through bore and the internal counterbore.

15. The device as in claim 14 wherein the bar member is further provided with a peripheral recess that is disposed proximate to, but spaced from the inboard end of the bar member and wherein said peripheral recess is dimensioned to receive the rotatable lock catch element.

16. The device as in claim 15 wherein said lock member is surrounded by a hardened plate that extends beyond the internal counterbore.

* * * * *